United States Patent
Humble

(10) Patent No.: US 10,252,894 B2
(45) Date of Patent: Apr. 9, 2019

(54) SELF-HOMING HOIST

(71) Applicant: Goodrich Corporation, Charlotte, NC (US)

(72) Inventor: Robert Humble, Brea, CA (US)

(73) Assignee: Goodrich Corporation, Charlotte, NC (US)

( * ) Notice: Subject to any disclaimer, the term of this patent is extended or adjusted under 35 U.S.C. 154(b) by 10 days.

(21) Appl. No.: 15/645,027

(22) Filed: Jul. 10, 2017

(65) Prior Publication Data

US 2019/0010031 A1 Jan. 10, 2019

(51) Int. Cl.
| | | |
|---|---|---|
| *B64D 1/22* | (2006.01) | |
| *B66D 1/12* | (2006.01) | |
| *B66D 1/50* | (2006.01) | |
| *H04L 29/08* | (2006.01) | |

(52) U.S. Cl.
CPC ............. *B66D 1/505* (2013.01); *B64D 1/22* (2013.01); *B66D 1/12* (2013.01); *H04L 67/12* (2013.01)

(58) Field of Classification Search
CPC .. B66D 1/505; B66D 1/22; B66D 1/12; H04L 67/12
See application file for complete search history.

(56) References Cited

U.S. PATENT DOCUMENTS

| | | | |
|---|---|---|---|
| 5,988,596 A | 11/1999 | Mitchell et al. | |
| 7,138,925 B2 * | 11/2006 | Nield .................. | B66D 1/40 340/685 |
| 9,016,665 B2 | 4/2015 | Lin et al. | |
| 9,255,377 B2 * | 2/2016 | Colwell .................. | E02F 3/304 |
| 10,023,312 B2 * | 7/2018 | Repp et al. | |
| 10,093,523 B2 * | 10/2018 | Averill et al. | |
| 2014/0070153 A1 | 3/2014 | Lin et al. | |
| 2015/0151821 A1 | 6/2015 | Yasukawa | |
| 2016/0075538 A1 * | 3/2016 | Johansson ................ | B66D 3/18 74/491 |
| 2017/0259941 A1 * | 9/2017 | Briggs, IV ................ | B64F 3/02 |
| 2017/0291707 A1 * | 10/2017 | Veronesi ................. | B64C 19/00 |
| 2018/0029671 A1 * | 2/2018 | Warnan et al. | |
| 2018/0072421 A1 * | 3/2018 | Prager et al. | |
| 2018/0201489 A1 * | 7/2018 | Schmidt | |

FOREIGN PATENT DOCUMENTS

EP 3070045 A1 9/2016

OTHER PUBLICATIONS

Extended European Search Report for European Patent Application No. 18182405.3, dated Dec. 12, 2018, 7 pages.

* cited by examiner

*Primary Examiner* — Nicholas Kiswanto
(74) *Attorney, Agent, or Firm* — Kinney & Lange, P.A.

(57) ABSTRACT

A self-homing hoist includes a controller configured to initiate a self-homing process to return the hook assembly to a homed position in response to each of at least one homing factor being true. Each homing factor is true or false based on a comparison of the current condition of the homing factor with a threshold requirement. If the current condition satisfies the threshold requirement, then the homing factor is true. If the current condition does not satisfy the threshold requirement, then the homing factor is false. Where all homing factors are true, the controller can initiate the self-homing process by activating a hoist motor to drive the cable drum and reel the hook assembly into the homed position.

20 Claims, 5 Drawing Sheets

SELF-HOMING HOIST

BACKGROUND

This disclosure relates generally to rescue hoists. More particularly, this disclosure relates to self-homing hook assemblies on rescue hoists.

Rescue hoists deploy and retrieve a cable to hoist persons or cargo. A motor and gear train cause a cable drum to rotate to deploy and retrieve the cable. A hook assembly is attached to an end of the cable extending from the rescue hoist. The hook assembly can attach to the person or cargo to connect the person or cargo to the cable. When the rescue hoist is not in operation, the hook assembly should be placed in a homed position. In the homed position, the hook assembly abuts the rescue hoist, and the cable is put in tension, which acts against the cable drum to hold the cable drum in place and prevent movement that can be caused by system vibrations. If the hook assembly is not returned to the homed position, the cable is not placed in tension and damage can occur to the rescue hoist due to system vibrations and aerodynamic loading.

SUMMARY

According to one aspect of the disclosure, a rescue hoist includes a motor configured to drive a cable drum about a cable drum axis, a cable disposed on the cable drum and an end of the cable extending through a hoist frame, a hook assembly disposed on the end of the cable, a plurality of sensors, and a controller operatively connected to the motor. Each sensor is configured to sense a condition related to at least one homing factor and to produce a signal including a current state of the condition. The controller includes a processor and a memory encoded with instructions that, when executed by the processor, cause the processor to compare the current state of the condition to a threshold requirement to determine a status of the at least one homing factor, and to activate the motor to reel the hook assembly to a homed position based on the status of each of the at least one homing factors being true.

According to another aspect of the disclosure, a method of homing a rescue hoist includes monitoring, with a controller, a plurality of signals of a rescue hoist for a current condition of a homing factor, comparing, with a processor, the current condition to a threshold requirement associated with the homing factor to determine a status of the homing factor, and activating a motor to draw a hook assembly to a homed position based on the status of the homing factor being true.

According to yet another aspect of the disclosure, a method of homing a hook assembly of a rescue hoist includes monitoring, with a controller, a plurality of signals for a first current condition of a plurality of current conditions associated with a first homing factor of a plurality of homing factors, recalling, from a memory of the controller, a first threshold requirement associated with the first homing factor, comparing, with a processor of the controller, the first current condition and the first threshold requirement to determine a first homing factor state, storing, in a memory of the controller, the first homing factor state, and driving the hook assembly to a homed position based on a homing factor state of each of the plurality of homing factors being true.

DETAILED DESCRIPTION

Figure 1A:
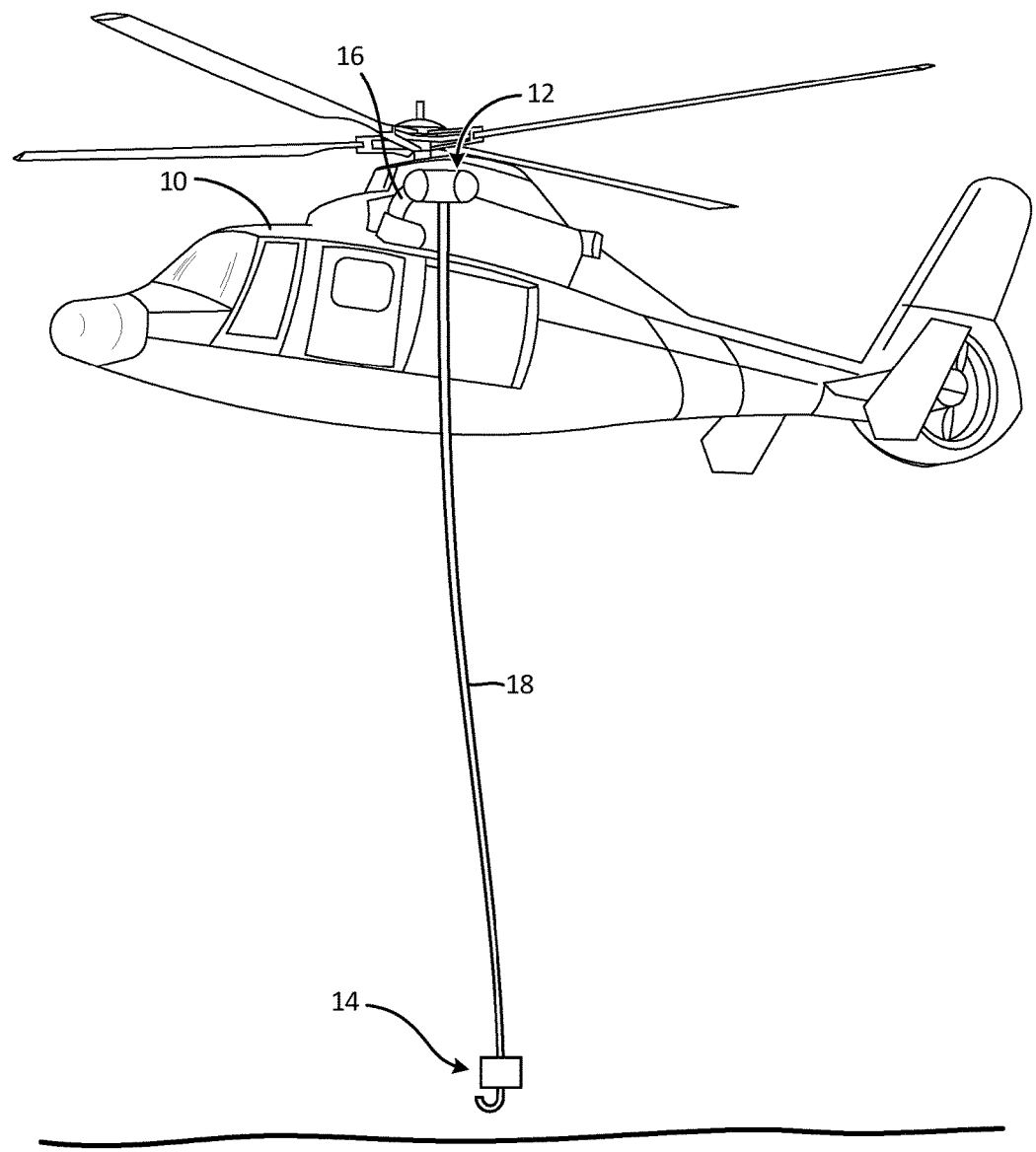
FIG. 1A is an elevation view of an aircraft and rescue hoist.
Figure 1B:
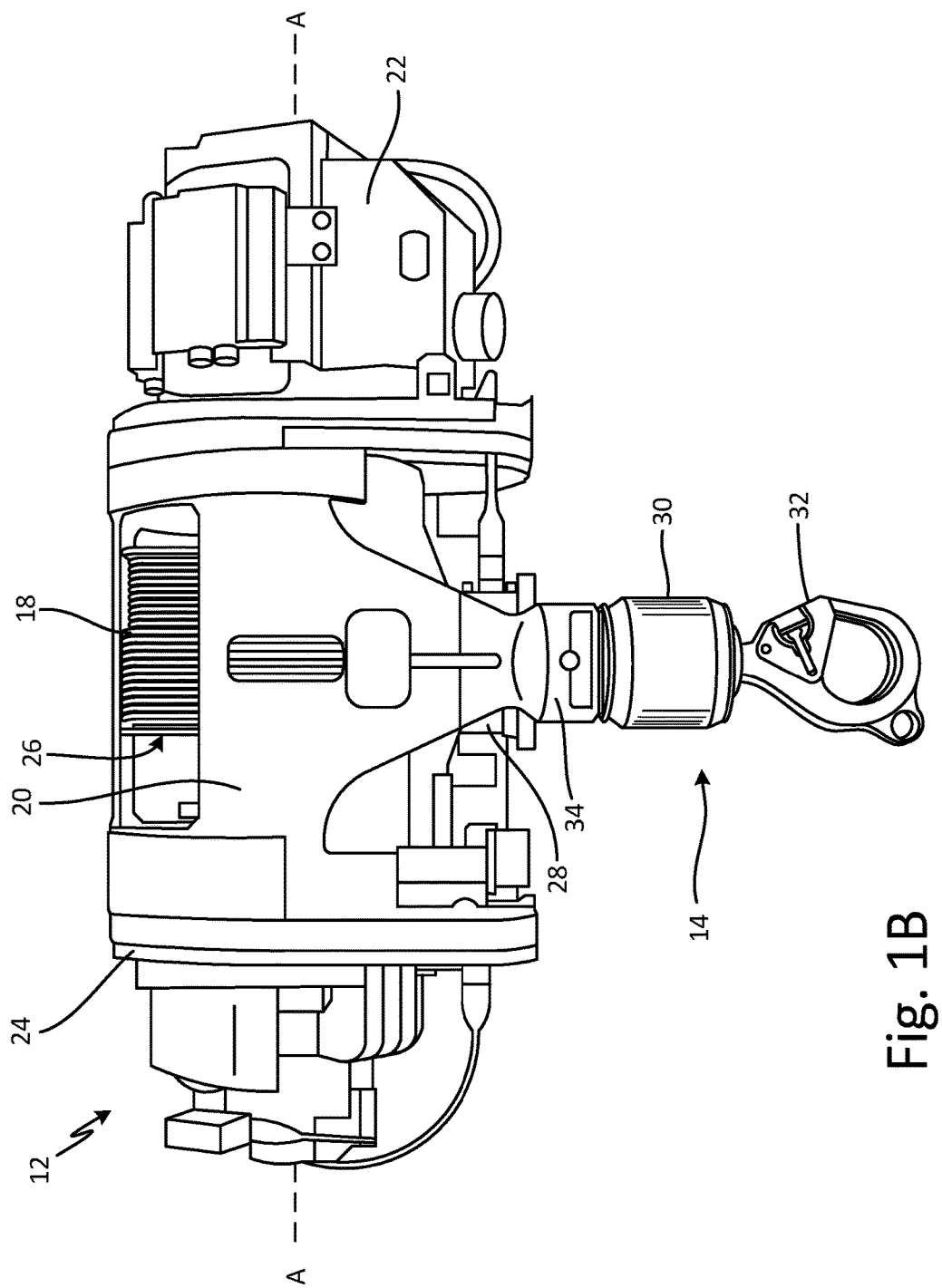
FIG. 1B is a front elevation view of a rescue hoist with a hook in a homed position.
Figure 1C:
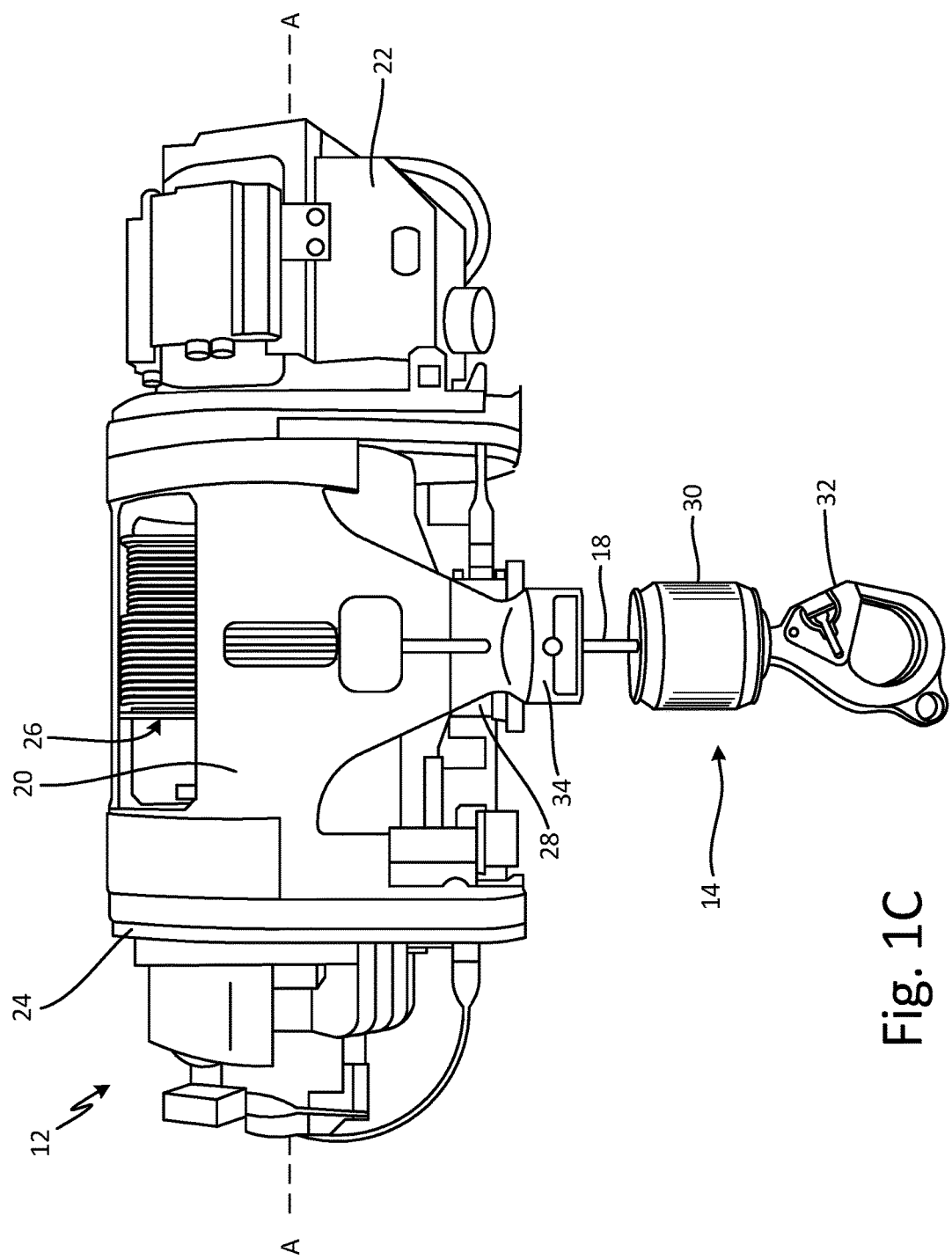
FIG. 1C is a front elevation view of a rescue hoist with a hook displaced from the homed position.

FIG. 1A is an elevation view of aircraft 10 and rescue hoist 12. FIG. 1B is a front elevation view of rescue hoist 12 showing hook assembly 14 in a homed position. FIG. 1C is a front elevation view of rescue hoist 12 showing hook assembly 14 displaced from the homed position. Rescue hoist 12 is mounted to aircraft 10 by support 16, and cable 18 extends from rescue hoist 12. Rescue hoist 12 includes hook assembly 14, cable 18, main housing 20, motor 22, drive train 24, cable drum 26, traction sheave 28, and cable guide 34. Hook assembly 14 includes bumper 30 and hook 32.

Main housing 20 is attached to support 16 to secure rescue hoist 12 to aircraft 10. Hook assembly 14 is disposed at a distal end of cable 18 outside of rescue hoist 12 and is configured to attach to an object to raise and lower the objects from aircraft 10. Motor 22 engages drive train 24, and drive train 24 is connected, either directly or indirectly, such as through an intermediate linear bearing, to cable drum 26. Drive train 24 provides power to cable drum 26 from motor 22 to drive cable drum 26 about cable drum axis A-A to raise and lower hook assembly 14 from rescue hoist 12. Cable 18 is disposed on cable drum 26 and extends through traction sheave 28 and cable guide 34.

In FIG. 1B, hook assembly 14 is shown in the homed position, where bumper 30 abuts cable guide 34. To home hook assembly 14, motor 22 winds cable drum 26 until bumper 30 abuts cable guide 34. With bumper 30 abutting cable guide 34, motor 22 continues to wind cable drum 26 causing bumper 30 to compress, building a desired level of tension in cable 18. The tension in cable 18 acts against cable drum 26 to cause cable drum 26 to remain in place and to prevent cable drum 26 from moving due to system vibrations. With bumper 30 abutting cable guide 34 and cable 18 in tension, motor 22 is deactivated and hook assembly 14 is in the homed position such that rescue hoist 12 is ready for transport.

In FIG. 1C, hook assembly 14 is shown displaced from the homed position. During operation, hook assembly 14 is lowered from and raised to rescue hoist 12. After operation, cable 18 is wound back onto cable drum 26 until hook assembly 14 reaches the homed position. In some instances, however, hook assembly 14 may not be properly homed after operations are complete. With hook assembly 14 displaced from cable guide 34, cable 18 is not placed in tension and the lack of tension allows cable drum 26 to displace due to system vibrations. The unintended displacement of cable drum 26 accelerates wear of components that vibrate against each other.

When rescue hoist 12 is not in operation, hook assembly 14 should be in a homed position, with hook assembly 14 abutting rescue hoist 12 and generating tension in cable 18. The tension in cable 18 prevents various components of rescue hoist 12 from moving due to system vibrations, which can cause premature wear and damage to the components.

Figure 2:
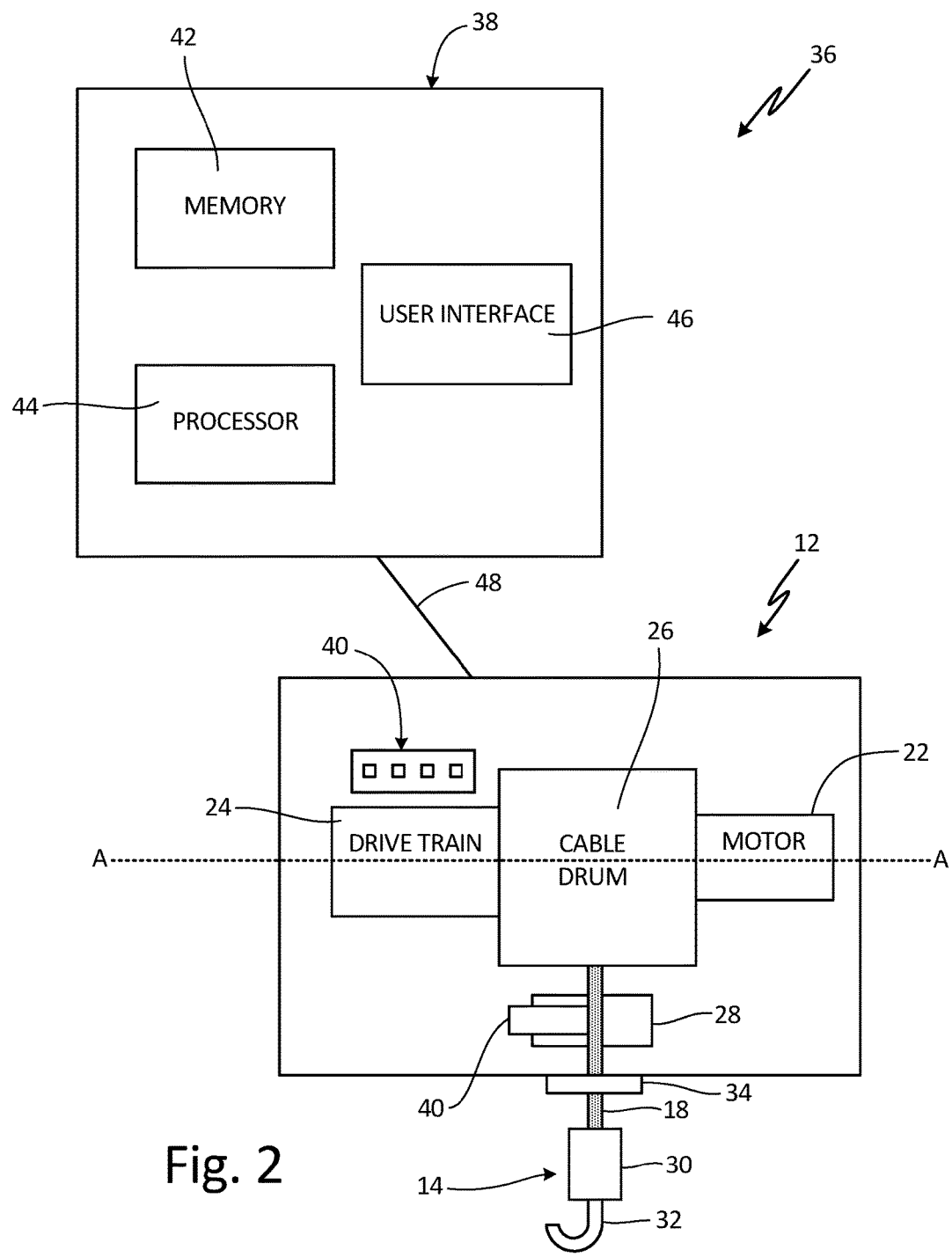
FIG. 2 is a block diagram of a rescue hoist and automatic hook assembly homing system.

FIG. 2 is a block diagram of system 36 for automatically homing hook assembly 14 of rescue hoist 12. System 36 includes rescue hoist 12, controller 38, and sensors 40. Controller 38 includes memory 42, processor 44, and user interface 46. Rescue hoist 12 includes hook assembly 14, cable 18, main housing 20 (shown in FIGS. 1B and 1C), motor 22, drive train 24, cable drum 26, and traction sheave 28. Hook assembly 14 includes bumper 30 and hook 32. Main housing 20 includes cable guide 34.

Cable drum 26 is rotatably supported by main housing 20. Motor 22 is supported by main housing 20. Drive train 24 is driven by motor 22 and is connected, either directly or indirectly, such as through an intermediate linear bearing, to cable drum 26. Drive train 24 provides power to cable drum 26 from motor 22 to drive cable drum 26 about cable drum axis A-A. Cable 18 is disposed on cable drum 26 and extends through traction sheave 28. Traction sheave 28 creates and maintains a back tension on cable 18 to prevent fouling of cable 18 as cable 18 winds on and off of cable drum 26.

The distal end of cable 18 exits rescue hoist 12 through cable guide 34. Hook assembly 14 is attached to the distal end of cable 18, with bumper 30 attached to cable 18 and hook 32 extending from bumper 30. Cable guide 34 provides a hard stop for bumper 30 to abut when hook assembly 14 is in the home position (shown in FIG. 1B). Cable guide 34 further provides a stationary payout point for cable 18 to exit rescue hoist 12. While cable 18 is described as exiting rescue hoist through a stationary payout point, it is understood that rescue hoist 12 can include a translating payout point. It is further understood that cable drum 26 can remain stationary or translate along cable drum axis A-A.

Sensors 40 are disposed throughout system 36 and are configured to sense various conditions of components of rescue hoist 12 and aircraft 10. Sensors 40 can be dedicated to system 36, or sensors 40 can provide information to various systems on aircraft 10 and rescue hoist 12 with controller 38 monitoring the information for relevant data. In some examples, sensors 40 can sense a rotation of cable drum 26, an activity state of motor 22, a length of cable 18 deployed, a flight state of aircraft 10 (shown in FIG. 1), and a load on cable 18, among others. In some examples, the activity state of motor 22 can indicate if motor 22 is activated or deactivated, and the flight state of aircraft 10 can indicate if aircraft 10 is hovering or in forward flight. While the flight state of aircraft 10 is described as indicating if aircraft is hovering or in forward flight, it is understood that the flight state can indicate if aircraft 10 is in flight in any direction. In some examples, whether aircraft 10 is hovering is indicated by an airspeed of aircraft 10 being above or below a threshold airspeed. Where the airspeed is below the threshold airspeed, then aircraft 10 is hovering, and where the airspeed is above the threshold airspeed, then aircraft 10 is in forward flight, regardless of the actual direction of flight.

Controller 38 can initiate a self-homing process. During the self-homing process, controller 38 automatically activates motor 22 to drive cable drum 26 and wind hook assembly 14 into the homed position based on a status of a homing factor being TRUE. Controller 38 communicates with components of rescue hoist 12 and aircraft 10 via communication link 48 and can control an automatic winding of cable 18 onto cable drum 26. Communication link 48 can be a wired or wireless connection. Processor 44, in one example, is a digital logic circuit capable of executing software or other instructions, for example, stored in memory 42. Examples of processor 44 can include any one or more of a microprocessor, a controller, a digital signal processor (DSP), an application specific integrated circuit (ASIC), a field-programmable gate array (FPGA), or other equivalent discrete or integrated logic circuitry.

Memory 42, in some examples, can be configured to store information during operation of controller 38. Memory 42, in some examples, is computer-readable storage media. In some examples, a computer-readable storage medium can include a non-transitory medium. In certain examples, a non-transitory storage medium can store data that can, over time, change (e.g., in RAM or cache). In some examples, memory 42 is a temporary memory, meaning that a primary purpose of memory 42 is not long-term storage. Memory 42, in some examples, is volatile memory, meaning that memory 42 does not maintain stored contents when power is turned off. In some examples, memory 42 is used to store program instructions for execution by processor 44. Memory 42, in one example, is used by software or applications running on controller 38 to temporarily store information during program execution. Memory 42 can be configured to store larger amounts of information than volatile memory. Memory 42 can further be configured for long-term storage of information. In some examples, memory 42 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

User interface 46, such as a hand-held control pendant, pilot-actuated switches, keyboard, touchscreen, monitor, mouse, or other suitable interface device, allows a user to interact with system 10, such as by retrieving information from memory 42, receiving notifications, initiating the software stored in memory 42, and inputting additional information to memory 42, among other examples. User interface 46 can also be configured to provide an output of information to the user, such as an output of the position of hook assembly 14 relative to the home position. For example, user interface 46 can include a sound card, a video graphics card, a speaker, a display device (such as a liquid crystal display (LCD), a light emitting diode (LED) display, an organic light emitting diode (OLED) display, etc.) or other type of device for outputting information in a form understandable to users or machines.

Controller 38 can initiate the self-homing process based on the status of one or more homing factors. Each homing factor is a factor associated with the state of rescue hoist 12 that, taken together with other homing factors, controller 38 can utilize to determine whether hook assembly 14 is in the home position, and if not, whether controller 38 should activate the self-homing process to home hook assembly 14. In some examples, the homing factors can include one or more of a length-deployed factor, a load factor, a motor-state factor, and a flight-status factor, among others. It is understood, however, that the self-homing cycle can include as many or as few homing factors as desired.

The status of each homing factor can be based on a comparison of a current condition of the homing factor and a threshold requirement associated with the homing factor. In some examples, processor 44 can execute software stored in memory 42 to determine the status of each homing factor based on a comparison of the current condition to the associated threshold requirement. The current condition of each homing factor can be stored in memory 42. The threshold requirement for each homing factor can also be stored in memory 42. If the current condition satisfies the threshold requirement, the homing factor is TRUE. If the current condition does not satisfy the threshold requirement, the homing factor is FALSE. Controller 38 can determine the status of each homing factor, and controller 38 can initiate the self-homing process based on the status of each homing factor being TRUE.

Controller 38 can determine the current condition for each homing factor based on the signals produced by sensors 40. The current condition is the present status of the homing factor. For example, if the homing factor is the length-deployed factor, which can be based on the length of cable 18 deployed from rescue hoist 12, the current condition can be an actual length of cable 18 deployed from rescue hoist 12 at that time. To determine the current condition of each homing factor, controller 38 can monitor information from sensors 40 or other systems on aircraft 10.

Each homing factor is further associated with a threshold requirement, which can be pre-stored in memory 42. A homing factor status is TRUE where the current condition of the homing factor satisfies the associated threshold requirement for that homing factor. For example, the threshold requirement can be a value that the homing factor must be one of above or below for the homing factor to be TRUE, or the threshold can be binary based on a status, such as whether such as motor 22 is activated or deactivated. It is understood, however, that the threshold can be any suitable boundary condition based on the homing factor that ensures the self-homing process is actuated when rescue hoist 12 is ready for hook assembly 14 to be homed. Each threshold can be pre-stored in memory 42. Processor 44 can execute software stored in memory 42 to compare the current condition of the homing factor to the associated threshold, and can determine the status of each homing factor as TRUE or FALSE based on the comparison.

In some examples, the self-homing process includes a single homing factor. In some examples, the self-homing process includes more than one homing factor. By way of example, the length-deployed factor, the load factor, the motor-state factor, and the airspeed factor, along with associated conditions and thresholds, are discussed below.

The length-deployed factor can be based on the length of cable 18 deployed from rescue hoist 12. In some examples, a current load condition can be the actual length of cable 18 deployed from rescue hoist 12. The length threshold can be based on a maximum length of cable 18 allowable outside of rescue hoist 12 for the self-homing process to initiate. As such, the length-deployed factor can be TRUE where the actual length of cable 18 deployed is less than the length threshold.

In some examples, controller 38 can determine the current length condition based on signals from sensors 40. In one example, sensors 40 can include an encoder configured to sense the rotation of cable drum 26 or motor 22, and controller 38 can calculate the actual length of cable 18 deployed from rescue hoist 12 based on the number of rotations. In some examples, a length threshold requirement can be less than about 30 cm (12 in) of cable 18 is deployed. It is understood, however, that the length threshold can be any suitable length such that controller 38 does not attempt to initiate the self-homing process where cable 18 is deployed for a hoist mission. It is further understood that the length threshold requirement can be a range within which the current length condition must fall to satisfy the length threshold requirement. For example, the length threshold requirement could require a length deployed between the homed position and a chosen outer threshold, such as a range of 0 cm and 30 cm. The 0 cm boundary can prevent controller 38 from initiating the self-homing process where hook assembly 14 is already homed. In examples where the length threshold requirement is less than 30 cm, the length-deployed factor is TRUE where the current length condition indicates that less than 30 cm of cable 18 is currently deployed.

The load factor can be based on the actual load on cable 18. In some examples, a current load condition can be the actual load on cable 18. A load threshold requirement can be based on a maximum load that ensures that cable 18 is unloaded when the self-homing process is initiated. As such, the load factor can be TRUE where the actual load on cable 18 is less than the load threshold.

In some examples, controller 38 can determine the current load condition based on signals from sensors 40. Sensors 40 can include a load sensor that senses the load on cable 18 at a given time. In one example, the load sensor can be a load cell disposed coaxially with traction sheave 28, and the load cell can be configured to sense the load applied to traction sheave 28 by cable 18. In one example, the load threshold can be about 2.25 kg (5 lb), which accounts for minimal loads on cable 18, such as the load of hook assembly 14. It is understood, however, that the load threshold requirement can be set at any suitably low load such that controller 38 does not cause rescue hoist 12 to enter the self-homing process while an active load is connected to hook assembly 14.

The motor-state factor can be based on the activity state of motor 22, such as whether motor 22 is activated or deactivated. In some examples, a current motor condition can be the present activity state of motor 22, activated or deactivated. In some examples, the current motor condition can include a time-delay, which can be provided by sensors 40, indicating the length of time that motor 22 has been in that present activity state. A motor-state threshold requirement can require that motor 22 is in one state prior to initiating the self-homing process, such as requiring motor 22 to be inactive. The motor-state threshold can also include a time delay requiring that the current motor condition has been in the required state for a preset time period before the motor-state factor is TRUE. For example, the motor-state threshold can be set such that the motor-factor state is TRUE when the current condition indicates that motor 22 is currently inactive and that motor 22 has been continuously inactive for an immediately preceding time period, such as 5 seconds, 10 seconds, 15 seconds, or some other time period. The time delay in the motor-state threshold prevents controller 38 from initiating the self-home process when motor 22 has been temporarily stopped during operation of rescue hoist 12. As such, the time delay in the motor-state threshold can ensure that rescue hoist 12 has ceased operation prior to homing hook assembly 14.

The motor-state factor can be TRUE where the present activity state of motor 22 matches the state required by the motor-state threshold requirement. In some examples, sensors 40 can include a sensor configured to sense the activity of motor 22 and to provide information regarding the activity state of motor 22 to controller 38. In another example, controller 38 can monitor the current or voltage provided to motor 22 to determine the current condition of motor. The state of the motor-state factor can also be stored in the memory.

The flight-state factor can be based on aircraft 10. A current flight condition associated with the flight-state factor can be the actual airspeed of aircraft 10 or an indication that aircraft 10 is either hovering or in forward flight. In some embodiments, the current flight condition can be whether aircraft 10 is actually in flight. Sensors 40 can include a sensor configured to sense the flight-status of aircraft 10, such as by sensing the airspeed of aircraft 10, sensing whether aircraft 10 is hovering or in forward flight, and/or sensing a weight-on-wheels. In one example, the current flight-status condition can be based on GPS locational data.

The flight threshold requirement can be based on the airspeed or other locational information related to aircraft 10 indicating that aircraft 10 is in forward flight and not in a hover state. As such, the flight-state factor can be TRUE where the current flight condition indicates that aircraft 10 is in forward flight. Because rescue hoist 12 is typically not in operation when aircraft 10 is in forward flight, hook assembly 14 can be self-homed during forward flight without interfering with the operation of rescue hoist 12. The flight threshold requirement can also be based on whether aircraft 10 is in flight based on the weight-on-wheels, and the flight-state factor can be TRUE where the current flight condition indicates no weight-on-wheels, such that the self-homing process is initiated in-flight. Setting the flight threshold requirement to require aircraft 10 to be in flight can prevent controller 38 from initiating the self-homing process if hook assembly 14 is displaced on the ground, such as during maintenance activities.

Controller 38 can initiate the self-homing process based on each of the homing factors being TRUE. Where each homing factor is TRUE, processor 44 commands motor 22 to drive the rotation of cable drum 26. Cable drum 26 winds cable 18 onto cable drum 26 until bumper 30 contacts cable guide 34. With bumper 30 in the homed position, motor 22 can continue to wind cable drum 26 until deactivated, such as by switches indicating that hook assembly 14 is in the homed position, by controller 38 sensing an increase in voltage or current, or by any other desired manner. With hook assembly 14 in the homed position, the components of rescue hoist 12 are properly stored and vibrations are minimized.

System 36 provides significant advantages. Automatically homing hook assembly 14 ensures that hook assembly 14 is properly homed regardless of the location where the user stops reeling. Homing hook assembly creates tension in the cable, which resists movement of the cable drum thereby holding the cable drum steady and preventing excess vibrations from harming components of rescue hoist 12. The homing factors prevent the self-homing process from initializing when rescue hoist is in operation, so the self-homing process does not interfere with standard operation. Ensuring that the hook assembly is in the home position eliminates unnecessary wear to components of the rescue hoist, thereby providing an increased operation life and reduced maintenance costs for the rescue hoist.

Figure 3:
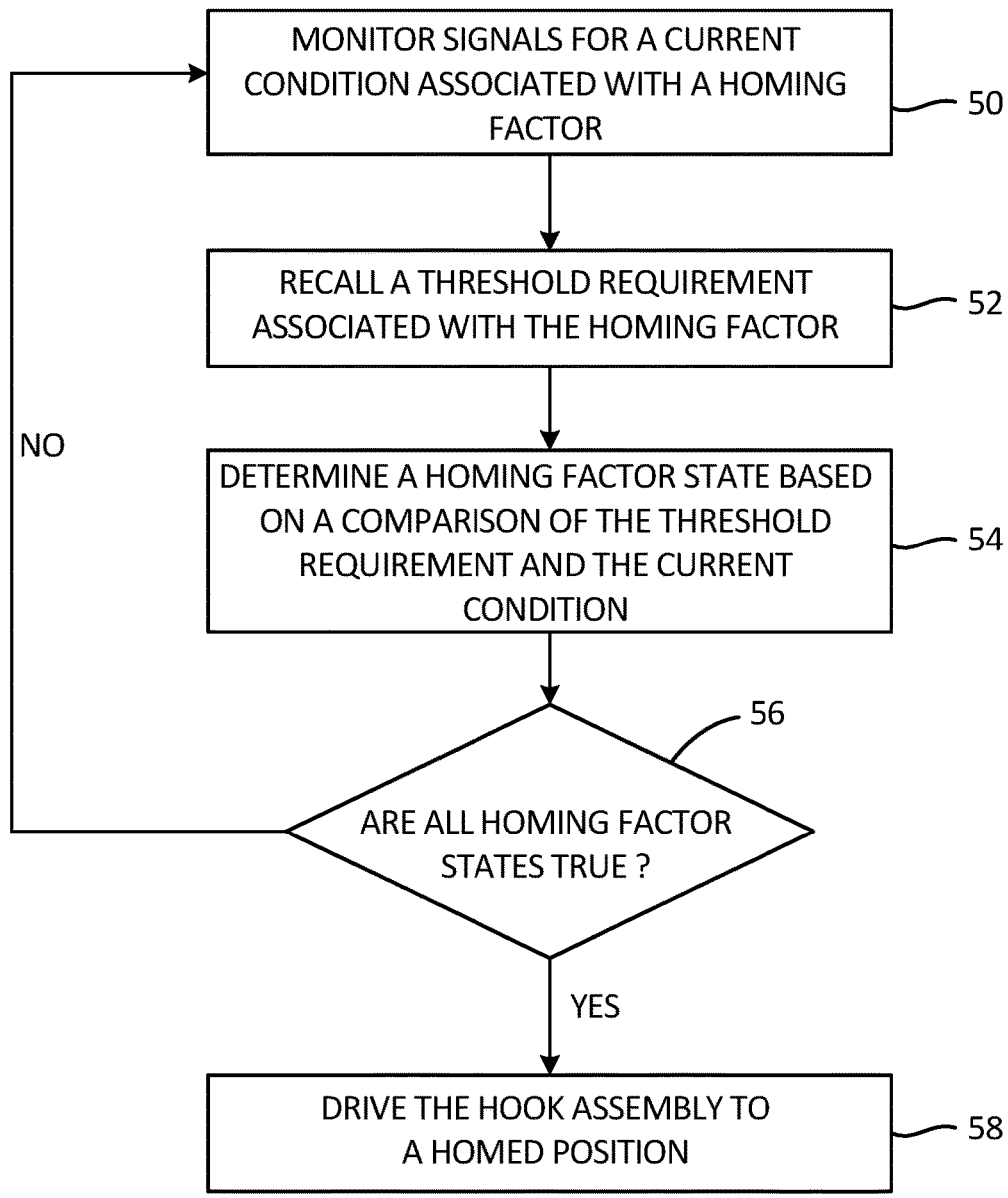
FIG. 3 is a flow chart depicting a method of homing a rescue hoist hook.

FIG. 3 is a flow chart of a process for initializing a self-homing cycle. At step 50, a controller, such as controller 38 (shown in FIG. 2), monitors signals, such as signals generated by sensors 40 (shown in FIG. 2) or other components of rescue hoist 12 (best seen in FIGS. 1B-1C), for information relating to a current condition associated with a homing factor. In some examples, the homing factors can include one or more of the length-deployed factor, the load factor, the motor-state factor, and the airspeed factor, among others. It is understood, however, that the self-homing process can include as many or as few homing factors as desired. The homing factors and the current condition associated with each homing factor can be stored in a memory, such as memory 42 (FIG. 2).

In step 52, a processor, such as processor 44 (FIG. 2), recalls threshold requirement information associated with the homing factors from the memory. Each homing factor is associated with a threshold requirement that the current condition of the homing factor must satisfy for the homing factor to be TRUE. Each threshold requirement can be pre-stored in the memory. In some examples, the threshold requirement can be a value that the homing factor must be less than, greater than, and/or equal to for the homing factor to be TRUE. In some examples, the threshold requirement can be based on a status, such as whether a component, such as motor 22 (FIG. 2), is in a particular state. It is understood, however, that the threshold requirement can be any suitable boundary condition related to the homing factor such that the self-homing cycle is initiated when desired.

In step 54, the current condition of each homing factor is compared with the associated threshold requirement to determine the state of the homing factor. For example, where the homing factors include the length-deployed factor and the motor-status factor, discussed in detail in FIG. 2, the length threshold requirement can be less than 30 cm (12 in) and the motor-status threshold requirement can be that the motor has been deactivated for at least the previous 5 seconds. The processor can compare the current length condition and the current motor-state condition to the length threshold requirement and the motor-status threshold requirement. If the current length condition is less than 30 cm, then the current length condition satisfies the length threshold requirement and the length-deployed factor is TRUE. The state of the length-deployed factor can be stored in the memory. If the motor has been inactive for at least 5 seconds, then the current motor condition satisfies the threshold motor requirement, and the motor-status factor is TRUE. The state of the motor-state factor can also be stored in the memory.

In step 56, the processor determines if the state of every homing factor is TRUE. The processor can recall the state of each homing factor, determined in step 54, from the memory. If at least one homing factor is FALSE, then the answer is NO and rescue hoist is not ready for the hook assembly to be homed. The process then proceeds back to step 50 and the controller continues to monitor the current condition of the homing factors. If every homing factor is TRUE, then the answer is YES, and the rescue hoist is ready for the hook assembly to be homed. The process then proceeds to step 58.

In step 58, the hook assembly is homed. The processor executes software stored in the memory, and the processor instructs the motor to drive the cable drum to wind the cable onto the cable drum. Winding the cable onto the cable drum draws the hook assembly into contact with the rescue hoist main housing. With the hook assembly abutting the rescue hoist main housing, the hook assembly is in the homed position. The motor can then be deactivated by, for example, contact switches on the hook assembly and the rescue hoist main housing, by detecting an increased voltage or current at motor, by detecting an increased load on the cable, or by any other suitable manner.

The self-homing process provides significant advantages. Homing hook assembly creates tension in the cable, which resists movement of the cable drum thereby holding the cable drum steady. Without the cable drum held steady, system vibrations can cause the cable drum to vibrate, which accelerates wear in the components of the rescue hoist that vibrate against one another. The self-homing process automatically homes the hook assembly when the rescue hoist is ready for homing. The self-homing process ensures that the hook assembly is in the home position when the rescue hoist is not in operation. Ensuring that the hook assembly is in the home position eliminates unnecessary wear to components of the rescue hoist, thereby providing an increased operation life and reduced maintenance costs for the rescue hoist.

Further, the homing factors prevent the self-homing process from initializing when the rescue hoist is in operation, so the self-homing process does not interfere with standard operation.

Discussion of Possible Embodiments

The following are non-exclusive descriptions of possible embodiments of the present invention.

A rescue hoist includes a motor configured to drive a cable drum about a cable drum axis, a cable disposed on the cable drum and an end of the cable extending through a hoist frame, a hook assembly disposed on the end of the cable, a plurality of sensors, and a controller operatively connected to the motor. Each sensor is configured to sense a condition related to at least one homing factor and to produce a signal including a current state of the condition. The controller includes a processor and a memory encoded with instructions that, when executed by the processor, cause the processor to compare the current state of the condition to a threshold requirement to determine a status of the at least one homing factor, and to activate the motor to reel the hook assembly to a homed position based on the status of each of the at least one homing factors being true.

The rescue hoist of the preceding paragraph can optionally include, additionally and/or alternatively, any one or more of the following features, configurations and/or additional components:

The at least one homing factor includes a length-deployed factor based on a length of cable deployed from the cable drum and a load factor based on a load on the cable.

The plurality of sensors include a deployment sensor configured to sense the length of cable deployed from the cable drum and to provide a current length condition based on the length of cable deployed, and a load sensor configured to sense the load on the cable and to provide a current load condition based on the load.

The length-deployed factor is true based on the current length condition being less than a length threshold.

The cable load-factor is true based on the cable load condition being is less than a load threshold.

The at least one homing factor further includes a motor-state factor based on an activity state of the motor.

The motor-state factor is true based on a comparison a current motor-state condition and a motor-state threshold, and wherein the motor-state threshold is satisfied based on the motor being in a deactivated state.

The at least one homing factor further includes a flight-state factor based on a movement of an aircraft supporting the hoist main housing.

The plurality of sensors further includes an airspeed sensor configured to sense an airspeed of the aircraft and to provide a current flight-state condition based on the airspeed.

The flight-state factor is true based on the current flight-state condition satisfying a flight-state threshold requirement, the flight-state threshold requirement being satisfied based on the current flight-state condition indicating that the aircraft is in a forward flight.

A method of homing a rescue hoist includes monitoring, with a controller, a plurality of signals of a rescue hoist for a current condition of a homing factor, comparing, with a processor, the current condition to a threshold requirement associated with the homing factor to determine a status of the homing factor, and activating a motor to draw a hook assembly to a homed position based on the status of the homing factor being true.

The method of the preceding paragraph can optionally include, additionally and/or alternatively, any one or more of the following features, configurations and/or additional components:

The homing factor comprises at least one of a length-deployed factor based on a length condition of the cable, a load factor based on a load condition of the cable, a flight-state factor based on a flight-state of an aircraft on which the rescue hoist is mounted, and a motor-state factor based on an activity state of a motor of the rescue hoist; and the threshold requirement includes at least one of a length threshold requirement, a load threshold requirement, a flight-state threshold requirement, and a motor-state threshold requirement.

The step of comparing, with a processor, the current condition to a threshold requirement associated with the homing factor to determine a status of the homing factor includes determining the current length condition based on a length-deployed signal generated by a length-deployed sensor, wherein the current length condition is based on the length of cable deployed from the rescue hoist, comparing the current length condition to the length threshold, and determining the status of the length-deployed factor based on the comparison of the current length condition and the length threshold, wherein the length-deployed factor is true based on the current length condition being less than the length threshold requirement.

The step of comparing, with a processor, the current condition to a threshold requirement associated with the homing factor to determine a status of the homing factor includes determining the current load condition based on a load signal generated by a load sensor, wherein the current load condition is based on the load on the cable, comparing the current load condition to the load threshold, and determining the status of the load factor based on the comparison of the current load condition and the load threshold, wherein the cable-load factor is true based on the current load condition being less than the load threshold.

The step of comparing, with a processor, the current condition to a threshold requirement associated with the homing factor to determine a status of the homing factor includes determining the current motor-state condition, wherein the current motor-state condition is based on an activity state of the motor, comparing the motor-state condition to the motor-state threshold requirement, and determining the status of the motor-state factor based on the comparison of the current motor-state condition and the motor-state threshold, wherein the motor-state factor is true based on the current motor state condition being an inactive state.

The step of comparing, with a processor, the current condition to a threshold requirement associated with the homing factor to determine a status of the homing factor includes determining the current flight-state condition, wherein the current flight-state condition is based on a forward flight of an aircraft supporting the rescue hoist, comparing the current flight-state condition to the flight-status threshold requirement, and determining the status of the flight-state factor based on the comparison of the current flight-state condition and the flight-state threshold requirement, wherein the flight-state factor is true based on the aircraft being in forward flight.

A method of homing a hook assembly of a rescue hoist includes monitoring, with a controller, a plurality of signals for a first current condition associated with a first homing factor, recalling, from a memory of the controller, a first threshold requirement associated with the first homing factor, comparing, with a processor of the controller, the first current condition and the first threshold requirement to determine a first homing factor state, storing, in a memory of the controller, the first homing factor state, and driving the hook assembly to a homed position in response to the first homing factor state being true.

The method of the preceding paragraph can optionally include, additionally and/or alternatively, any one or more of the following features, configurations and/or additional components:

Monitoring, with the controller, the plurality of signals for a second current condition associated with a second homing factor, recalling, from the memory of the controller, a second threshold requirement associated with the second homing factor, comparing, with the processor of the controller, the second current condition and the second threshold requirement to determine a second homing factor state, storing, in a memory of a computer, the second home homing factor state, and driving the hook assembly to the homed position in response to both the first homing factor state and the second homing factor state being true.

The step of driving the hook assembly to a homed position in response to the first homing factor state being true includes activating, with the controller, the motor, driving, with the motor, a cable drum about a cable drum axis, reeling a cable onto the cable drum to cause the hook assembly to abut a hoist main housing, and deactivating the motor in response to the hook assembly abutting the hoist main housing.

The first homing factor includes at least one of a length-deployed factor, a cable-load factor, a motor-state factor, and a flight-status factor.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A rescue hoist comprising:
   a motor configured to drive a cable drum about a cable drum axis;
   a cable disposed on the cable drum and an end of the cable extending through a hoist main housing;
   a hook assembly disposed on the end of the cable;
   a plurality of sensors, wherein each sensor is configured to sense a condition related to at least one homing factor and to produce a signal including a current state of the condition;
   a controller operatively connected to the motor, the controller comprising:
      a processor; and
      a memory encoded with instructions that, when executed by the processor, cause the processor to compare the current state of the condition to a threshold requirement to determine a status of the at least one homing factor, and to activate the motor to reel the hook assembly to a homed position based on the status of each of the at least one homing factors being true.

2. The rescue hoist of claim 1, wherein the at least one homing factor comprises:
   a length-deployed factor based on a length of cable deployed from the cable drum; and
   a load factor based on a load on the cable.

3. The rescue hoist of claim 2, wherein the plurality of sensors comprise:
   a deployment sensor configured to sense the length of cable deployed from the cable drum and to provide a current length condition based on the length of cable deployed; and
   a load sensor configured to sense the load on the cable and to provide a current load condition based on the load.

4. The rescue hoist of claim 3, wherein the length-deployed factor is true based on the current length condition being less than a length threshold.

5. The rescue hoist of claim 3, wherein the cable load-factor is true based on the cable load condition being is less than a load threshold.

6. The rescue hoist of claim 2, wherein the at least one homing factor further comprises:
   a motor-state factor based on an activity state of the motor.

7. The rescue hoist of claim 6, wherein the motor-state factor is true based on a comparison a current motor-state condition and a motor-state threshold, and wherein the motor-state threshold is satisfied based on the motor being in a deactivated state.

8. The rescue hoist of claim 2, wherein the at least one homing factor further comprises:
   a flight-state factor based on a movement of an aircraft supporting the hoist.

9. The rescue hoist of claim 8, wherein the plurality of sensors comprise:
   an airspeed sensor configured to sense an airspeed of the aircraft and to provide a current flight-state condition based on the airspeed.

10. The rescue hoist of claim 9, wherein the flight-state factor is true based on the current flight-state condition satisfying a flight-state threshold requirement, the flight-state threshold requirement being satisfied based on the current flight-state condition indicating that the aircraft is in a forward flight.

11. A method of homing a rescue hoist, the method comprising:
   monitoring, with a controller, a plurality of signals of a rescue hoist for a current condition of a homing factor;
   comparing, with a processor, the current condition to a threshold requirement associated with the homing factor to determine a status of the homing factor; and
   activating a motor to draw a hook assembly to a homed position based on the status of the homing factor being true.

12. The method of claim 11, wherein:
   the homing factor comprises at least one of a length-deployed factor based on a length condition of the cable, a load factor based on a load condition of the cable, a flight-state factor based on a flight-state of an aircraft on which the rescue hoist is mounted; and a motor-state factor based on an activity state of a motor of the rescue hoist; and
   the threshold requirement includes at least one of a length threshold requirement, a load threshold requirement, a flight-state threshold requirement, and a motor-state threshold requirement.

13. The method of claim 12, wherein the step of comparing, with a processor, the current condition to a threshold requirement associated with the homing factor to determine a status of the homing factor comprises:
  determining the current length condition based on a length-deployed signal generated by a length-deployed sensor, wherein the current length condition is based on the length of cable deployed from the rescue hoist;
  comparing the current length condition to the length threshold;
  determining the status of the length-deployed factor based on the comparison of the current length condition and the length threshold, wherein the length-deployed factor is true based on the current length condition being less than the length threshold requirement.

14. The method of claim 12, wherein the step of comparing, with a processor, the current condition to a threshold requirement associated with the homing factor to determine a status of the homing factor comprises:
  determining the current load condition based on a load signal generated by a load sensor, wherein the current load condition is based on a load on the cable;
  comparing the current load condition to the load threshold; and
  determining the status of the load factor based on the comparison of the current load condition and the load threshold, wherein the cable-load factor is true based on the current load condition being less than the load threshold.

15. The method of claim 12, wherein the step of comparing, with a processor, the current condition to a threshold requirement associated with the homing factor to determine a status of the homing factor comprises:
  determining the current motor-state condition, wherein the current motor-state condition is based on an activity state of the motor;
  comparing the motor-state condition to the motor-state threshold requirement; and
  determining the status of the motor-state factor based on the comparison of the current motor-state condition and the motor-state threshold, wherein the motor-state factor is true based on the current motor state condition being an inactive state.

16. The method of claim 12, wherein the step of comparing, with a processor, the current condition to a threshold requirement associated with the homing factor to determine a status of the homing factor comprises:
  determining the current flight-state condition, wherein the current flight-state condition is based on a forward flight of an aircraft supporting the rescue hoist;
  comparing the current flight-state condition to the flight-status threshold requirement; and
  determining the status of the flight-state factor based on the comparison of the current flight-state condition and the flight-state threshold requirement, wherein the flight-state factor is true based on the aircraft being in forward flight.

17. A method of homing a hook assembly of a rescue hoist, the method comprising:
  monitoring, with a controller, a plurality of signals for a first current condition of a plurality of current conditions associated with a first homing factor of a plurality of homing factors;
  recalling, from a memory of the controller, a first threshold requirement associated with the first homing factor;
  comparing, with a processor of the controller, the first current condition and the first threshold requirement to determine a first homing factor state;
  storing, in a memory of the controller, the first homing factor state; and
  driving the hook assembly to a homed position based on a homing factor state of each of the plurality of homing factors being true.

18. The method of claim 17, further comprising:
  monitoring, with the controller, the plurality of signals for a second current condition associated with a second homing factor;
  recalling, from the memory of the controller, a second threshold requirement associated with the second homing factor;
  comparing, with the processor of the controller, the second current condition and the second threshold requirement to determine a second homing factor state;
  storing, in a memory of a computer, the second home homing factor state.

19. The method of claim 17, wherein the step of driving the hook assembly to a homed position in response to the first homing factor state being true comprises:
  activating, with the controller, the motor;
  driving, with the motor, a cable drum about a cable drum axis;
  reeling a cable onto the cable drum to cause the hook assembly to abut a hoist main housing; and
  deactivating the motor in response to the hook assembly abutting the hoist main housing.

20. The method of claim 17, wherein the first homing factor includes at least one of a length-deployed factor, a cable-load factor, a motor-state factor, and a flight-status factor.

* * * * *